United States Patent
Doye et al.

(10) Patent No.: US 8,460,793 B2
(45) Date of Patent: Jun. 11, 2013

(54) COMPONENT WITH A SELF-HEALING SURFACE LAYER, SELF-HEALING ENAMEL OR COATING POWDER WITH SELF-HEALING CHARACTERISTICS

(75) Inventors: Christian Doye, Berlin (DE); Oliver Hofacker, Berlin (DE); Jens Dahl Jensen, Berlin (DE); Ursus Krüger, Berlin (DE)

(73) Assignee: Siemens Aktiengesellschaft, Müchen (DE)

( * ) Notice: Subject to any disclaimer, the term of this patent is extended or adjusted under 35 U.S.C. 154(b) by 184 days.

(21) Appl. No.: 13/000,519

(22) PCT Filed: Jun. 23, 2009

(86) PCT No.: PCT/EP2009/057769
§ 371 (c)(1),
(2), (4) Date: Dec. 21, 2010

(87) PCT Pub. No.: WO2009/156376
PCT Pub. Date: Dec. 30, 2009

(65) Prior Publication Data
US 2011/0111207 A1    May 12, 2011

(30) Foreign Application Priority Data
Jun. 25, 2008   (DE) .......................... 10 2008 030 189

(51) Int. Cl.
*B32B 5/16*   (2006.01)
(52) U.S. Cl.
USPC .................. 428/403; 428/323; 428/411.1

(58) Field of Classification Search
USPC ....................... 428/403, 323, 411.1
See application file for complete search history.

(56) References Cited

U.S. PATENT DOCUMENTS

| | | | |
|---|---|---|---|
| 6,075,072 A * | 6/2000 | Guilbert et al. | 523/200 |
| 2004/0055686 A1* | 3/2004 | Cowger et al. | 152/516 |
| 2005/0085564 A1* | 4/2005 | Thiel | 523/206 |
| 2006/0042504 A1 | 3/2006 | Kumar et al. | |
| 2007/0087198 A1* | 4/2007 | Dry | 428/408 |
| 2007/0166542 A1* | 7/2007 | Braun et al. | 428/402.21 |

FOREIGN PATENT DOCUMENTS

| | | |
|---|---|---|
| CN | 1286720 | 3/2001 |
| DE | 10058595 A1 | 6/2002 |
| DE | 102004010212 A1 | 9/2005 |
| EP | 355028 A1 | 2/1990 |
| WO | WO 9946338 A1 | 9/1999 |
| WO | WO 2007082153 A2 | 7/2007 |

OTHER PUBLICATIONS

Firma Capsulation NanoDcience AG, DE; LBL-Technology(R)—A key to innovative products; 2003; pp. 1-4.

* cited by examiner

Primary Examiner — Hoa (Holly) Le

(57) ABSTRACT

A component with a self-healing surface layer, a self-healing enamel and a coating powder are disclosed. A self-healing is guaranteed by a reactive substance, which is encased in sheathed particles. Only damage to the enamel coating leads to a destruction of the coating, preferably under the influence of a catalytic material, so that the encased fluid enamel can emerge. Under the effects of UV light the fluid enamel cures and seals the crack thus occurring.

17 Claims, 2 Drawing Sheets

COMPONENT WITH A SELF-HEALING SURFACE LAYER, SELF-HEALING ENAMEL OR COATING POWDER WITH SELF-HEALING CHARACTERISTICS

CROSS REFERENCE TO RELATED APPLICATIONS

This application is the US National Stage of International Application No. PCT/EP2009/057769, filed Jun. 23, 2009 and claims the benefit thereof. The International Application claims the benefits of German application No. 10 2008 030 189.2 filed Jun. 25, 2008. All of the applications are incorporated by reference herein in their entirety.

FIELD OF INVENTION

The invention relates to a component with a self-healing surface layer, in the interior of which a reactive substance is dispersed, whose chemical composition corresponds to a pre-stage of the material of the surface layer, where in the event of exposure through damage to the surface this pre-stage can be converted spontaneously into the material of the surface layer. The invention further relates to a self-healing enamel, having a solvent and a coating material. Dispersed in the enamel is a reactive substance, whose chemical composition corresponds to a pre-stage of the coating material, where this pre-stage too can be converted spontaneously into the material of the coating material in the event of exposure. Finally, the invention also relates to a coating powder, which contains particles of a coating material. A reactive substance is also dispersed in the powder, whose chemical composition corresponds to a pre-stage of the coating material, where this pre-stage is spontaneously converted into the material of the coating material in the event of exposure.

BACKGROUND OF INVENTION

The spontaneous conversion of pre-stages of coating material into the coating material itself under certain conditions is employed according to the prior art in order to guarantee the self-healing properties of coatings or coating materials. Such a self-healing layer or the coating material (enamel) used for this purpose is for example to be taken from EP 355 028 A1. This here involves a coating of roof tiles, which is intended to extend their useful life under weather conditions. To this end a lower enamel layer of the roof tile contains an aromatic ketone, which in the case of UV-irradiation or under the influence of sunlight activates the cross-linking of lower enamel layers and thus effects a healing of mechanical defects through the spontaneous creation of chemical compounds. Use of the word 'spontaneously' in connection with this invention should be taken to mean that the self-healing process is not set in motion as a result of the external influence of a control process—for example after monitoring by a human agency—but is instead set in motion in the environment of the location of use of the surface layer—for example atmospheric weather conditions—automatically based on the properties of the surface layer and the environmental conditions. The control of the self-healing process is preferably undertaken by means of UV-irradiation (solar radiation), where the dosation of the UV-irradiation cannot be influenced, but rather depends on the weather conditions in the area of application. The solar radiation in Mediterranean countries is, for example, higher on average and precipitation lower than for example in the Nordic countries. The setting of the parameters for self-healing of the enamel thus gives rise to certain problems.

Other self-healing enamel systems according to the prior art dispense with active components in the coating, but instead solely make use of a physical residual flow capability of a coating after hardening, for example in order to heal scratches that may have occurred. Such enamels are based inter alia in the outermost layer on a polyurethane compound. If such a so-called PUR-enamel is heated, for example by means of solar radiation, the enamel layers flow, whereby damage of the same is leveled out. The comparatively high flow capability of the coating required for this does however presuppose a low cross-linking density. In the case of many applications this leads to inadequate mechanical resistance, which for example does not fulfill the requirements for automotive applications in respect of scratch-proof properties or resistance to chemicals.

SUMMARY OF INVENTION

The object of the invention thus lies in the provision of a coating system with self-healing properties or components for the manufacture of such a coating, which on the one hand guarantees a high degree of resilience of the layer (for example resistance to scratches) and on the other provides a precise spontaneous self-healing effect which sets in a precise manner.

This problem is solved by the component or self-healing enamel or coating powder set out in the preamble in that the reactive substance contained in the coating material forms the core of sheathed particles, where the coating comprises an oxidizable substance. According to the invention it is also proposed that the reactive substance responsible for the self-healing is provided in a so-called core-shell structure, so that the reactive substance which provides the material for a reaction that effects the self-healing remains protected until its use becomes necessary. The shell made up of the oxidizable substance guarantees this protection as long as the sheathed particles are completely encased in the layer. This is achieved in that the layer represents an oxidation protection for the sheathed particles.

However as soon as damage to the layer occurs, and a coated particle is exposed, the coated particle is subject to, among other things, the oxygen in the air. Under the effect of the atmospheric conditions (sunlight, heat) an oxidation of the oxidizable substance of the coating then takes place, whereby this is destroyed and the reactive substance is released. This can, for example, comprise fluid enamel, which has the composition of the layer and cures under the environmental conditions (sunlight, heat) for example. In this manner the damaged location of the layer is at least partially filled, and continued protection of the component thereby guaranteed.

The following particular embodiments of the invention relate equally to the inventive component, the inventive self-healing enamel and the inventive coating powder. For example it is advantageously possible for a photoactivatable or a thermoactivatable catalytic material to be deposited on the surface of the shell of the particles, which in the case of the activation supports the oxidation of the oxidizable substance of the coating. Self-healing coating systems for example can thereby advantageously be used in northern regions of the world, where the solar radiation would not be sufficient for a sufficiently rapid oxidation of the oxidizable coatings of the sheathed particles and for which reason it would not be possible completely to rule out damage to the coated components. The catalytic material accelerates the oxidation of the oxidizable substance, so that a healing process ensues advantageously rapidly. Photo- and/or thermoactivatable substances which come under consideration include, for example, titanium oxide, zinc oxide or indium zinc oxide. These materials possess the property of initiating or accelerating the oxidation of the oxidizable substance, by means of light or heat, through their catalytic effect. As a result of the humidity of the air, the catalytically active particles, in particular titanium oxide, generate oxygen and hydroxide radicals, which lead to an acceleration of the oxidation of the reactive substance of the coating of the particles. Of course as a result of more serious damage to the layer, the sheathes of the particles can also be mechanically destroyed, which has the additional advantage that the self-healing process is immediately set in motion, so that in the case of serious damage to the layer the maximum potential of the self-healing properties can also be made available.

Alternatively it is also possible for a photoactivatable or a thermoactivatable catalytic material to be stored in the core of the particles. In the event of an activation, the oxidation of the oxidizable substance of the coating is supported in the manner already described. In the case of the photoactivatable catalytic material being used it must be borne in mind that the reactive substance and the oxidizable substance of the coating must here be transparent for electromagnetic irradiation of the excitation wavelengths of the photoactivatable material. This is because only in this way can the photoactivatable catalytic material become active with the sheathed particles still in a closed state, and thus support the oxidation of the shell.

A further alternative provides for catalyst particles made up of photoactivatable or thermoactivatable material to be dispersed in the product. In the event of an activation by means of damage to the layer these serve to support the oxidation of the oxidizable substance of the coating. To this end it is necessary for there to be an even distribution of the sheathed particles and the catalyst particles in the layer. Only in this way is it guaranteed that local damage of the layer releases both coated particles and catalyst particles and the catalyst particles can thus assume their function.

It is further advantageously possible for the reactive substance to comprise two components. This means that both coated particles of the one component and coated particles of the other component are available in the layer. As soon as particles of both components are opened up by means of damage to the layer (that is oxidative destruction of the coating), the components are mixed at the site of the damage. The components can thus be selected such that the coating material is created by means of mixing, via an appropriate reaction. This variant of the invention has the advantage that the formation of the coating materials can take place independently of an external energy source (sunlight, heat) and in this way particularly rapid healing is possible. Multi-component polyurethane enamel systems can, for example, be employed.

It is nevertheless not absolutely essential that the two components are in each case contained in different particles, where the particles in the layer or the coating material exist in mixed form. It is also conceivable that the two components are present in mixed form in each sheathed particle. Here, however, it is only possible to use material compounds which do not react without the application of an activation energy. The coating of the particles then protects this mixture from a reaction, until the destruction of this coating ensues as a result of damage to the layer and the possible introduction of an activation energy.

A procedure known as LBL-Technology®, which can be obtained from Capsulation Nanoscience AG is available for manufacture of the sheathed particles for example. In the case of this technology tailor-made particles with core and shell can be made available by means of a layer by layer (LBL) structure. The shell materials can for example comprise substances which are destroyed in an oxidative manner in air, oxygen, in particular in the presence of suitable catalytic materials, such as titanium oxide.

BRIEF DESCRIPTION OF THE DRAWINGS

Further details of the invention are explained below on the basis of the drawing. The same or corresponding elements of the drawing are in each case provided with the same reference characters and are explained repeatedly only insofar as there are differences between the individual figures, in which.

DETAILED DESCRIPTION OF INVENTION

Figure 1:
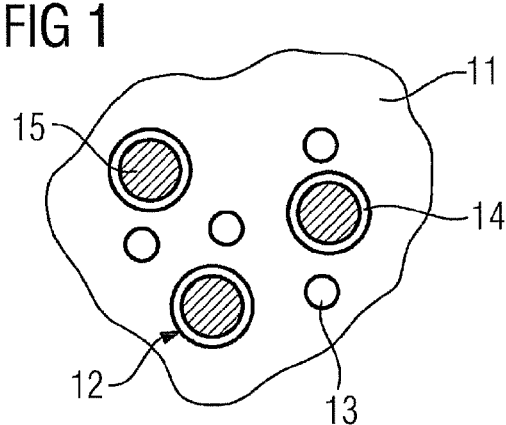
FIGS. 1 to 3 show exemplary embodiments of the inventive enamel.

A self-healing enamel 11 according to FIG. 1 has a dispersion of, on the one hand sheathed particles 12 and reactive particles 13. These are evenly distributed in the enamel, so that a mixture of the specified particles results. The sheathed particles have on the one hand a coating 14 of an oxidizable substance and a core 15 made of a reactive substance. The oxidizable substance and the reactive substance have the properties already described, which come into effect as soon as the subsequently cured enamel is damaged.

Figure 2:
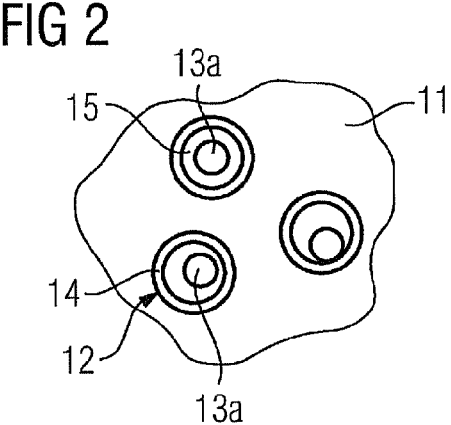

The enamel 11 according to FIG. 2 contains a dispersion exclusively comprising sheathed particles 12. A reactive particle 13a is additionally provided in the core 15 of these particles. Alternatively (not shown) a multiplicity of reactive particles, in particular nanoparticles, can be provided. These can in turn form a dispersion in the core 15. The material of the core and of the coating are transparent to light with an excitation wavelength for the catalytic material of the reactive particles.

Figure 3:
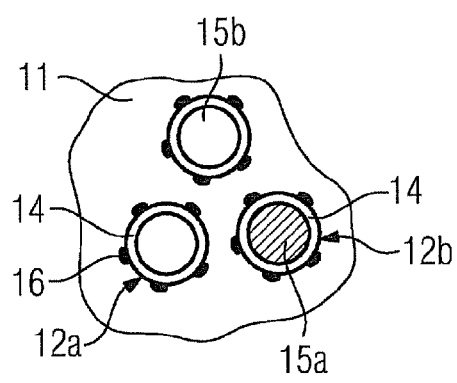

In FIG. 3, coated particles 12a, 12b are used in the enamel 11, in which the reactive substance 16 is distributed as islands on the coating 14. Two types of coated particles 12a, 12b are present, where these are distinguished in that different types of component of the enamel are encased as the core 15 in the coatings 14. In the case of damage to the sheathed particles these components are mixed, after emerging from the coatings 14 and can be cured into an enamel.

Figure 4:
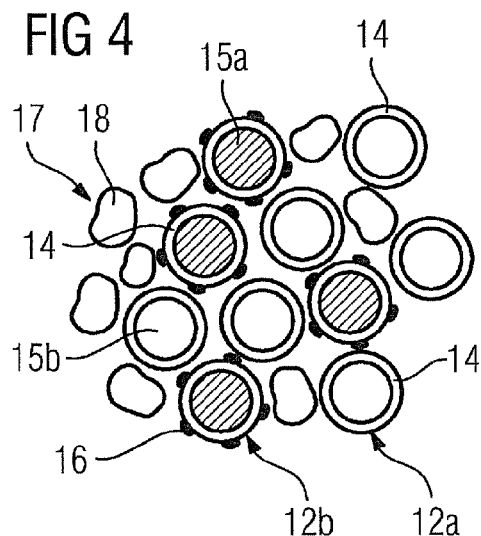
FIG. 4 shows an exemplary embodiment of the inventive powder and FIGS. 5 to 8 show an exemplary embodiment of the inventive component in different phases of the self-healing.

FIG. 4 shows a powder 17 in schematic form, which is suitable for the manufacture of a layer for example by means of powder-coating. This has coated particles 12a, 12b, whose function is analogous to FIG. 3. The two components of the different cores 15 of the sheathed particles 12a, 12b provide a two-component system, which creates a coating material at least similar to the remaining powder particles 18, which is suitable for self-healing of the layer which is created by means of powder-coating. The catalytic material is provided only on one type of the sheathed particles 12b. This simplifies the manufacture of the sheathed particles 12a, where the catalytic material 16 on the sheathed particles 12b is also employed for oxidation of the coatings 14 of the particles 12a.

The types of embodiments of FIGS. 1 to 4 can of course also be used in other combinations, which are not shown.

Figure 5:
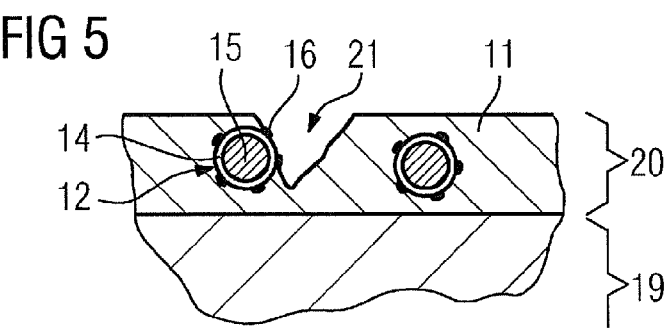
Figure 6:
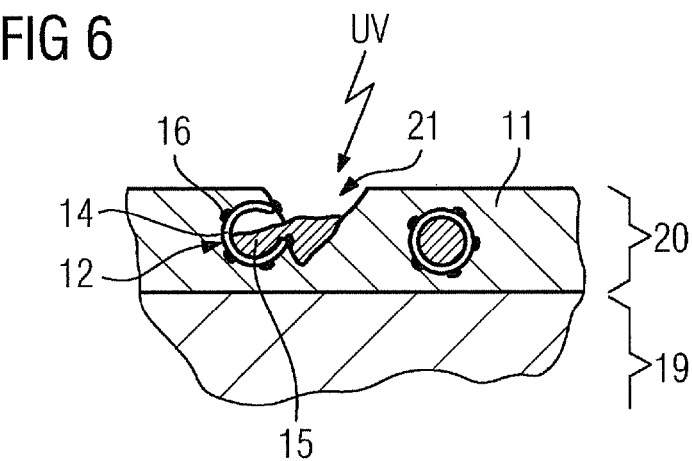

FIG. 5 shows a sectional view through a component 19 with a self-healing surface layer 20. The surface layer 20 comprises the enamel 11, which has cured and in which the sheathed particles 12 are dispersed. The enamel 11 has been damaged by a crack 21, where one of the sheathed particles 12 has been exposed. Its shell 14, which now forms part of the crack surface, bears islands of the catalytic substance 16, which, as shown in FIG. 6, leads under the effect of UV-irradiation to an oxidation and consequently to a destruction of the coating 14. The reactive substance 15 can hereby emerge from the core of the sheathed particles 12 and flows into the crack 21.

Figure 7:
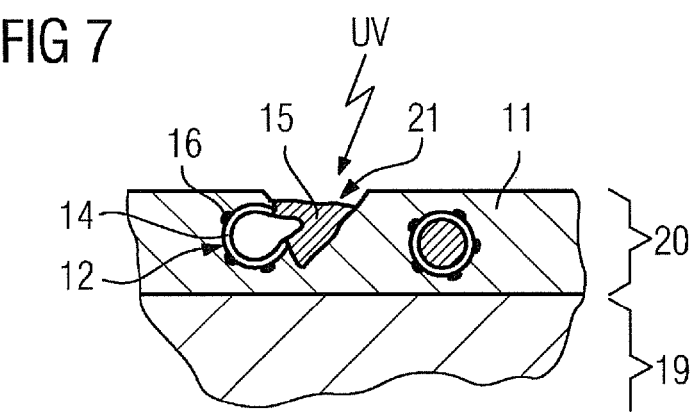
Figure 8:
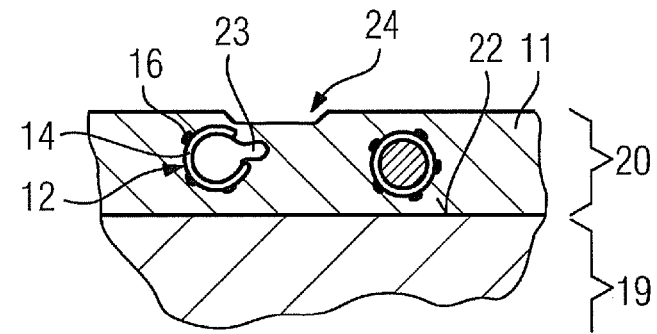

As can be seen in FIG. 7, the reactive substance 15 (fluid enamel) is cured through the effects of further UV irradiation. In FIG. 8 it is evident that the crack 21 is hereby largely closed again according to FIG. 5. It can also be seen that the self-healing cannot be completed on grounds of lack of material, where however it is guaranteed that the surface 22 of the component 19 is protected again. Possible defects in the layer 20 that may be mentioned are blow-holes 23 or residual depressions 24.

The invention claimed is:

1. A component with a self-healing surface layer, comprising:
   a plurality of sheathed particles, dispersed within the interior of the self-healing surface layer, each of the plurality of sheathed particles comprising:
      a reactive substance whose chemical composition comprises a pre-stage of a material of the self-healing surface layer; and
      a coating comprising an oxidizable substance;
   wherein the reactive substance forms a core and the coating sheaths the reactive substance; and
   wherein the pre-stage converts spontaneously into the material of the self-healing surface layer when a respective sheathed particle of the plurality of sheathed particles is exposed to environmental oxygen through damage to the self-healing surface layer;
   wherein the self-healing surface layer provides an oxidation protection for the sheathed particles, and the coating is destroyed upon exposure to the environmental oxygen under atmospheric conditions, releasing the reactive substance.

2. The component as claimed in claim 1, wherein at least one of the plurality of sheathed particles comprises:
   a thermoactivatable catalytic material, which supports the oxidation of the oxidizable substance of the coating when the at least one of the sheathed particles is exposed to environmental heating, the thermoactivatable catalytic material stored on a surface of the coating of the at least one of the plurality of sheathed particles.

3. The component as claimed in claim 1, wherein each of the plurality of sheathed particles further comprises:
   a photoactivatable catalytic material, which supports the oxidation of the oxidizable substance of the coating when the sheathed particle is exposed to an environmental electromagnetic radiation, the photoactivatable catalytic material stored in the core of the at least one of the plurality of sheathed particles in addition to the reactive substance wherein the reactive substance and the oxidizable substance are transparent to electromagnetic irradiation of an excitation wavelength of the photoactivatable material, wherein the environmental irradiation activates the photoactivatable catalytic material, causing it to accelerate the oxidative destruction of the coating.

4. The component as claimed in claim 1, further comprising:
   a plurality of catalyst particles composed of a photoactivatable or a thermoactivatable material, which supports the oxidation of the oxidizable substance of the coating when the sheathed particle is exposed to electromagnetic radiation or heat respectively, the plurality of catalyst particles are dispersed in the self-healing surface layer.

5. The component as claimed in claim 1, wherein the reactive substance comprises two components.

6. The component as claimed in claim 5, wherein the two components are in each case contained in different sheathed particles and a mixture of different sheathed particles is dispersed in the self-healing surface layer.

7. A self-healing enamel having a coating material, comprising:
   a reactive substance whose chemical composition comprises a pre-stage of a material of the coating material;
   a coating comprising an oxidizable substance that is destroyed by atmospheric oxygen; and
   a sheathed particle, within the interior of the self-healing surface enamel, comprising the reactive substance and the coating, wherein the reactive substance forms a core of the sheathed particle and the coating sheaths the reactive substance,
   wherein the pre-stage converts spontaneously into the material of the coating material in the event of release the reactive substance into the coating material by exposure of the sheathed particle to environmental oxygen.

8. The self-healing enamel as claimed in claim 7, wherein the sheathed particle comprises:
   a thermoactivatable catalytic material, which supports the oxidation of the oxidizable substance of the coating when the sheathed particle is exposed to environmental heating, the thermoactivatable catalytic material stored on a surface of the coating of the sheathed particle.

9. The self-healing enamel as claimed in claim 7, wherein the sheathed particle further comprises:
   a photoactivatable catalytic material, which supports the oxidation of the oxidizable substance of the coating when the sheathed particle is exposed to environmental electromagnetic radiation, the photoactivatable catalytic material stored in the core of the sheathed particle in addition to the reactive substance, wherein the reactive substance and the oxidizable substance are transparent to electromagnetic irradiation of an excitation wavelength of the photoactivatable material, wherein the environmental irradiation activates the photoactivatable catalytic material, causing it to accelerate oxidative destruction of the coating.

10. The self-healing enamel as claimed in claim 7, further comprising:
    a catalyst particle composed of a photoactivatable or a thermoactivatable material, which supports the oxidation of the oxidizable substance of the coating when the sheathed particle is exposed to electromagnetic radiation or heat respectively, the catalyst particle being disposed within the coating material.

11. The self-healing enamel as claimed in claim 7, wherein the reactive substance comprises two components.

12. A coating powder, comprising:
    particles made of a coating material,
    a plurality of sheathed particles, dispersed within the coating material, each of the plurality of sheathed particles comprising:
       a reactive substance whose chemical composition comprises a pre-stage of a material of the coating material; and
       a coating comprising an oxidizable substance that is destroyed by atmospheric oxygen;
    wherein the reactive substance forms a core and the coating sheaths the reactive substance; and wherein the pre-stage converts spontaneously into the material of the coating material when a respective sheathed particle of the plurality of sheathed particles is exposed to atmospheric oxygen through damage to the coating material.

13. The coating powder as claimed in claim 12, wherein at least one of the plurality of sheathed particles comprises:

a photoactivatable or a thermoactivatable catalytic material, which supports the oxidation of the oxidizable substance of the coating when the at least one of the sheathed particles is exposed, the photoactivatable or the thermoactivatable catalytic material stored on a surface of the coating of the at least one of the plurality of sheathed particles.

14. The coating powder as claimed in claim 12, wherein at least one of the plurality of sheathed particles comprises:

a photoactivatable or a thermoactivatable catalytic material, which supports the oxidation of the oxidizable substance of the coating when the sheathed particle is exposed, the photoactivatable or the thermoactivatable catalytic material stored in the core of the at least one of the plurality of sheathed particles, where in the case of the photoactivatable catalytic material, the reactive substance and the oxidizable substance is transparent for electromagnetic irradiation of the excitation wavelengths of the photoactivatable material.

15. The coating powder as claimed in claim 12, further comprising:

a plurality of catalyst particles composed of a photoactivatable or a thermoactivatable material, which supports the oxidation of the oxidizable substance of the coating when the sheathed particle is exposed, the plurality of catalyst particles are dispersed in the coating material.

16. The coating powder as claimed in claim 12, wherein the reactive substance comprises two components.

17. The coating powder as claimed in claim 16, wherein the two components are in each case contained in different sheathed particles and a mixture of different sheathed particles is dispersed in the coating material.

* * * * *